(12) United States Patent
Popat et al.

(10) Patent No.: US 6,317,036 B1
(45) Date of Patent: Nov. 13, 2001

(54) VOICE ALERT SYSTEM FOR USE ON BICYCLES AND THE LIKE

(76) Inventors: Pradeep P. Popat, 1515 S. Jefferson Davis Hwy., Apt. 1321; Mara R. Peltz, 1200 S. Arlington Ridge Rd., No. 305, both of Arlington, VA (US) 22202

( * ) Notice: Subject to any disclaimer, the term of this patent is extended or adjusted under 35 U.S.C. 154(b) by 0 days.

(21) Appl. No.: 09/482,012

(22) Filed: Jan. 13, 2000

(51) Int. Cl.[7] ....................................................... B62J 3/00
(52) U.S. Cl. ............................ 340/432; 340/427; 340/692
(58) Field of Search ................................. 340/432, 425.5, 340/474, 692, 427

(56) References Cited

U.S. PATENT DOCUMENTS

| | | | |
|---|---|---|---|
| 5,404,444 | * 4/1995 | Billings | 395/161 |
| 5,438,702 | * 8/1995 | Jackson | 455/89 |
| 5,617,303 | * 4/1997 | Izzo, Sr. | 362/72 |
| 5,737,247 | * 4/1998 | Baer et al. | 364/565 |
| 6,015,160 | * 1/2000 | Spector | 280/288.4 |

* cited by examiner

*Primary Examiner*—Nina Tong

(57) ABSTRACT

A voice alert system 10 for use on bicycles and similar human-powered vehicles. When triggered by the user, it generates one or more safety alerts in the form of pre-established voice messages. It consists of a switch assembly connected to a random-access voice playback module, which in turn drives an amplifier and forward-facing speaker. These components are supported by a main housing and a speaker housing, which in turn are attached to the the host bicycle by means of a clamp assembly. The switch assembly includes at least one switch for producing a triggering signal. On receipt of the triggering signal, the voice playback module produces an electrical representation of a pre-established voice alert, which is amplified by the amplifier and projected by the speaker. Optionally, one or more additional switches are provided to trigger one or more additional voice alerts. The content of the voice alerts will typically be safety-related, such as "passing on your left", "passing on your right", etc., and will typically have humorous or entertaining accents or dialects to encourage use. One or more alerts may be pre-established at the factory; optionally, the voice playback module can be provided with a recording capability to allow the user to record his or her own alerts.

5 Claims, 6 Drawing Sheets

Alternative Embodiment

Alternative Embodiment

VOICE ALERT SYSTEM FOR USE ON BICYCLES AND THE LIKE

BACKGROUND

1. Field of the Invention

Our invention is in the field of audible alert systems for use on bicycles and other human-propelled means of transportation.

2. Discussion of Prior Art

Because bicycles must coexist with automobiles, pedestrians, and other traffic, many types of safety alert devices have been developed to enable cyclists to signal their presence to others. These include audible alerts (e.g., bells, buzzers, horns, etc.) as well as visual alerts (reflectors, lights, lighted and mechanical turn signals etc.). These prior-art devices are effective at reducing many of the risks associated with operating bicycles on bicycle paths and public roadways. However, each of these devices suffers from one or more disadvantages.

Bells, Buzzers, and Horns

Bells, buzzers, and horns constitute the oldest and most popular type of warning alert for use with bicycles. These are effective at warning pedestrians, in-line skaters, and other cyclists of the presence of an approaching bicycle. However, they suffer from at least two disadvantages:

They provide no information on the direction of approach, or intended path, of the user. Many bicycle accidents occur when a cyclist attempts to pass a pedestrian, in-line skater, or slower cyclist. When individuals about to be passed hear such an alert, they must take their eyes from the road or path and look backward to determine whether the approaching cyclist will pass on the right side or left side, and then move in the opposite direction. The short time required to do this can significantly reduce the time available to avoid an accident. Even worse, on hearing such an alert, individuals will sometimes instinctively begin moving to the right without first looking backward, under the assumption that the cyclist will be passing on the left—but this is not always the case. When a cyclist is attempting to pass on the right, this type of instinctive response to conventional audible alerts can actually increase the chances (or severity) of an accident.

Use of bells, buzzers, and horns is considered unfashionable by many cyclists, particularly adolescents. As a result, only a small fraction of bicycles are equipped with such devices.

Visual Alerts

Visual alerts, such as reflectors and lights, are effective at increasing the general visibility of cyclists to others sharing the roadways. Lighted and mechanical turn signals can also be effective at signaling following vehicles of the user's intention to turn, which can significantly reduce the chances of a serious accident. However, these conventional visual alerts suffer from at least three disadvantages:

Visual alerts must be within the field of view of the intended recipient of the signal. For this reason, they are effective at signaling following vehicles, but largely ineffective at signaling vehicles or pedestrians ahead. As a result, the use of visual alerts on a bicycle will not significantly reduce the risks associated with passing other cyclists, pedestrians, or in-line skaters, particularly on crowded bicycle paths.

While lighted visual alerts are effective at night, they are substantially less effective during the day.

As with audible alerts, use of visual safety alerts is considered unfashionable by many cyclists, particularly adolescents. As a result, only a small fraction of bicycles are equipped with such devices.

Spoken Alerts

In some localities, a bicycle-path etiquette has evolved which calls for cyclists to issue a spoken alert upon approaching others sharing the bike path. Such an alert, such as "passing on your left!", can substantially reduce the risks associated with passing pedestrians and slower cyclists. However, spoken alerts suffer from at least three disadvantages:

Use of spoken alerts is often tiresome, especially on a crowded bicycle path, and can even cause vocal fatigue and hoarseness.

Many cyclists are too shy to use spoken alerts. Others are unable or unwilling to speak loudly enough to be clearly heard.

Use of spoken alerts is considered unfashionable by many cyclists, particularly adolescents.

Summary of Prior-Art Limitations

As discussed above, prior-art alert systems for use on bicycles suffer from one or more of four disadvantages:

Conventional audible alert systems provide no information on the direction of approach, or intended path, of the user.

Conventional visual alert systems are largely ineffective at signaling individuals ahead of the user, particularly during the daytime.

Use of conventional spoken alerts is often tiresome, inconvenient, and intimidating.

Use of conventional audible, visual, and spoken alerts is considered unfashionable by many cyclists.

OBJECTS AND ADVANTAGES

It is therefore an object of this invention to provide a safety alert system for bicycles which:

is able to instantly signal the user's presence and intended path to pedestrians, in-line skaters, and other bicyclists ahead of the user, thereby reducing risks of accidents while passing;

is effective during both daytime and nighttime; and is fun to use and offers the potential to be considered fashionable, thereby encouraging use by bicyclists who would otherwise eschew safety alerts.

Further objects and advantages will become apparent from a consideration of the drawings and ensuing description.

DESCRIPTION OF DRAWINGS

FIG. 5A shows a perspective view, FIG. 5B shows a rear view, and FIG. 5C shows a side view.

FIG. 6A shows the preferred embodiment installed on the handlebar of a host bicycle. FIG. 6B shows a detailed view of a clamping assembly used on the preferred embodiment.

FIG. 7 shows the electronic configuration, while FIG. 8 shows the installed physical configuration.

LIST OF REFERENCE NUMERALS

Figure 1:
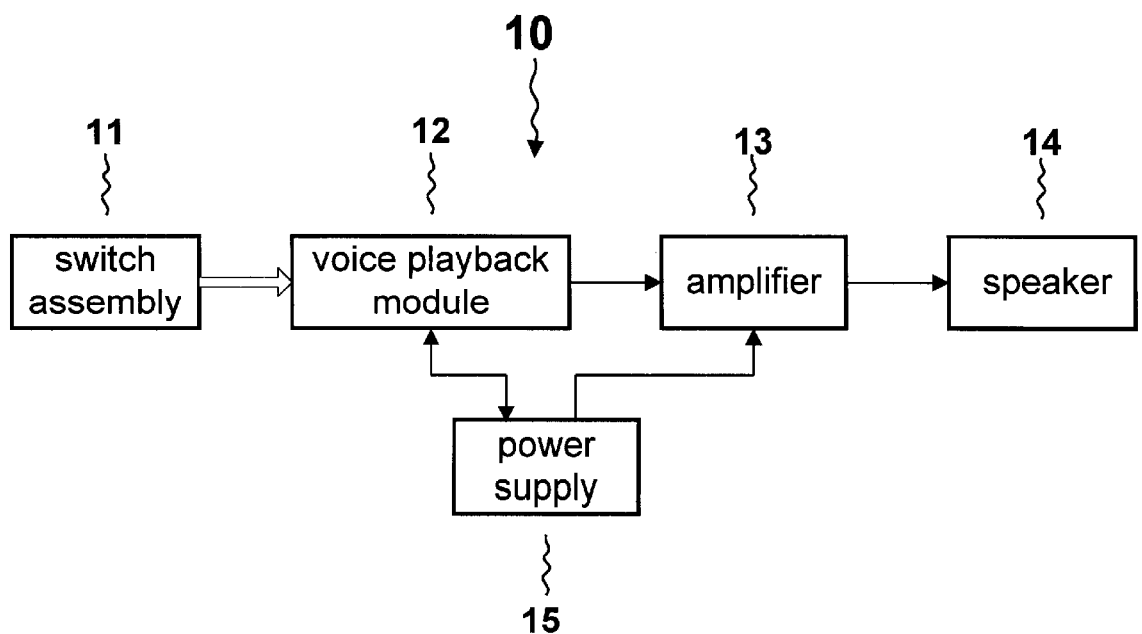
FIG. 1 shows an electronic block diagram of a preferred embodiment of a voice alert system according to subject invention.

10 Voice alert system
11 switch assembly
12 voice playback module
13 amplifier
14 speaker
15 battery-based power supply
16A–16F switches
17 QV-301 IC
18 ISD33060 IC
19 shutdown line
20 3-V power line
21 3-V battery
22 DC-to-DC converter
23 main housing
24 speaker housing
25 button assembly
26 vent
27 clamp assembly
28 upper portion
29 lower portion
30 pivot
31 blot
32 handlebar

SUMMARY OF THE INVENTION

Our invention is a voice alert system for use on bicycles and similar human-powered vehicles. When triggered by the user, it generates one or more safety alerts in the form of pre-established voice messages. It consists of a switch assembly connected to a random-access voice playback module, which in turn drives an amplifier and forward-facing speaker. These components are supported by a housing assembly, which in turn is attached to the handlebars of the host bicycle by means of a clamp assembly. The switch assembly includes at least one switch for producing a triggering signal. On receipt of the triggering signal, the voice playback module produces an electrical representation of a pre-established voice alert, which is amplified by the amplifier and projected by the speaker. Optionally, one or more additional switches are provided to trigger one or more additional voice alerts.

The content of the voice alerts will typically be safety-related, such as "passing on your left", "passing on your right", etc., and will typically have humorous or entertaining accents or dialects to encourage use. One or more alerts may be pre-established at the factory; optionally, the voice playback module can be provided with a recording capability to allow the user to record his or her own alerts.

DESCRIPTION OF THE PREFERRED EMBODIMENT

Practical implementation of our invention involves both electronic and physical considerations. These are described separately in the following paragraphs.

While our invention is novel, neither its electronic nor its physical aspects—when considered individually—fall outside the bounds of conventional practice. Accordingly, useful embodiments of our invention will appear electronically similar to many known devices, and physically similar to other known devices. The following descriptions make extensive reference to these known devices to better describe our invention and its preferred mode of implementation.

FIG. 1: Electronic Block Diagram of Voice Alert System 10

FIG. 1 shows an electronic block diagram of a voice alert system 10 according to our invention. It consists of a switch assembly 11 connected to a voice playback module 12, which in turn drives an amplifier 13 connected to a speaker 14. A battery-based power supply 15 is connected to module 12 and amplifier 13. Switch assembly 11 is a conventional device consisting of at least one momentary-contact SPST switch having an actuating button (not shown), wherein manual actuation of the button causes assembly 11 to produce an electronic triggering signal. Optionally, assembly 11 includes additional switches, so that it is capable of producing additional signals in response to actuation of additional buttons. More detail on switch assembly 11 will be provided subsequently.

Voice playback module 12 is a conventional device which produces:

an electrical representation of at least one pre-established voice message upon receipt of a corresponding electronic triggering signal, as well as power-control signals for amplifier 13 and power supply 15.

Optionally, module 12 is capable of producing additional representations of additional pre-established voice messages upon receipt of additional corresponding triggering signals. Module 12 is a random-access device, in the sense that it is capable of directly reproducing each pre-established voice message—and only that message—upon receipt of the corresponding triggering signal. More detail concerning module 12 will be given subsequently.

Amplifier 13 and speaker 14 are conventional devices which amplify audio-frequency electrical signals and convert those signals into acoustic signals, respectively. Amplifier 13 should also have a power-down, or stand-by, capability to extend battery life.

We have found that system 10 is effective in a typical application when amplifier 13 and speaker 14 are together capable of producing a Sound Pressure Level (SPL) of at least 60 dB SPL, measured on-axis and 1 meter from speaker 14, while reproducing voice alerts. Practitioners in the art will appreciate that the maximum SPL capability of system 10 will depend not only on the design of amplifier 13 and speaker 14, but also on characteristics of the enclosure in which speaker 14 is mounted. Thus, the design of amplifier 13 and speaker 14 will represent a tradeoff between SPL (and, hence, the distance over which the voice alerts can be heard), size, weight, cost, and battery life. These tradeoffs can be made according to conventional practice, per the information provided herein, to optimize system 10 for a particular application.

In the preferred embodiment, amplifier 13 is based on the TDA8541 audio amplifier IC (not shown), manufactured by Phillips Semiconductors (a division of Philips Electronics N.V., Eindhoven, The Netherlands). The TDA8541 is capable of delivering an output power of 1 watt to an 8-ohm load at a supply voltage of 5 volts. The TDA8541 also offers a standby mode, making it well-suited for battery-powered applications. The standby mode is initiated by bringing a control line (not shown) high. Extensive applications information for the TDA8541 is available on-line from Phillips' website (http://www-eu3.semiconductors.com/).

In the preferred embodiment, speaker 14 is a 2" diameter paper-cone speaker with an impedance of 4 ohms and a reference efficiency of 84 db SPL at 1 meter with 1 watt input power.

Battery-based power supply 15 is a conventional device which stores energy in a battery (not shown) and provides power to module 12 and amplifier 13, in response to power control signals from module 12. More information on supply 15 will be provided subsequently.

From FIG. 1 and the preceding description, practitioners in the art will recognize system 10 as a conventional, battery-powered, random-access voice-playback system, capable of reproducing one or more pre-established voice messages in response to manual switch actuations. In this sense, system 10 is electronically equivalent to various commercial products, such as:

Augmentative communication systems, which are devices to help speech-challenged people communicate with other individuals. An example of such a device is the Tech/Four™, manufactured by the Mayer-Johnson Company of Solana Beach, Calif., USA. The Tech/Four™ is capable of reproducing any of four pre-established voice messages upon manual actuation of a corresponding button.

Toys and novelty devices, such as the See 'n Say series of toys manufactured by Fisher-Price (now a division of Mattel Corporation). The See 'n Say toys reproduce any of several pre-recorded sounds (typically animal noises) upon manual actuation of a corresponding switch.

Since system 10 is electronically equivalent to available commercial devices, practitioners in the art will already be familiar with many of the engineering details required to implement it. However, the following paragraphs provide additional detail to further assist in implementing useful embodiments of our invention.

Figure 2:
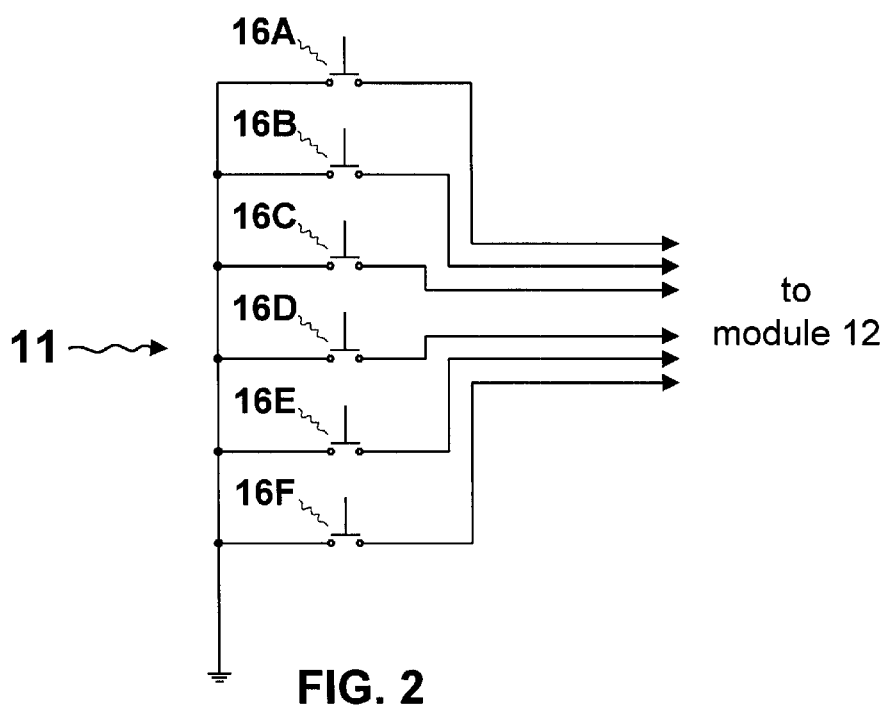
FIG. 2 is a block diagram of a switch assembly of the preferred embodiment.

FIG. 2: Switch Assembly 11

Switch assembly 11 is a convention assembly capable of producing at least one electronic triggering signal in response to manual actuation of a switching device. FIG. 2 is a schematic diagram of a preferred embodiment of switch assembly 11, which comprises six SPST switches, each sharing a common grounded terminal. Thus, assembly 11 has six output lines, each of which is grounded upon actuation of the corresponding button.

Figure 3:
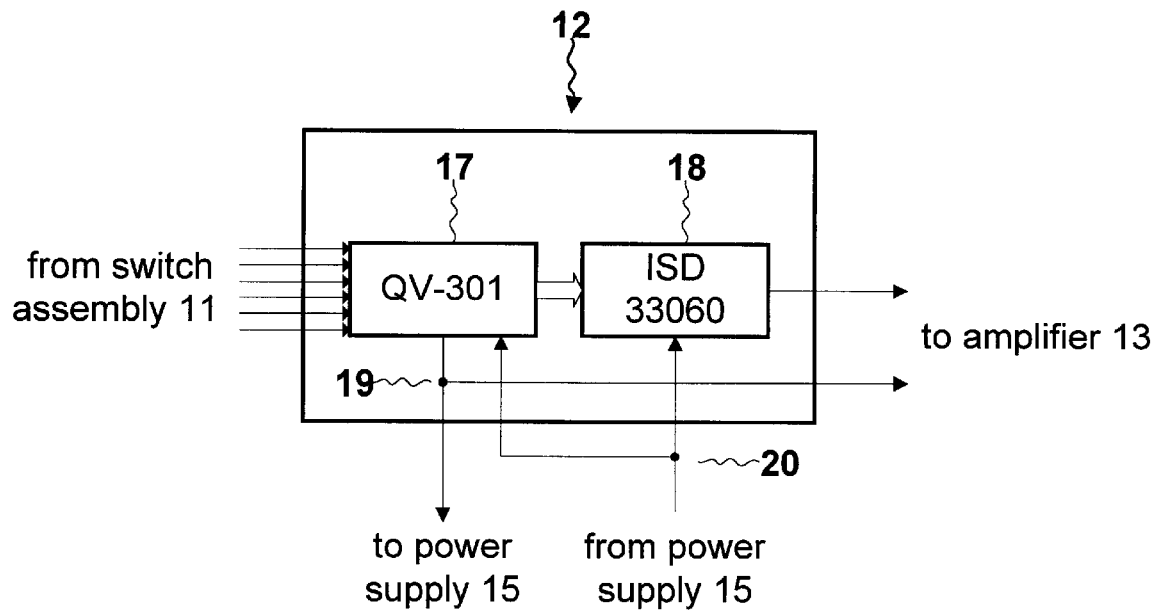
FIG. 3 is a block diagram of a voice playback module of the preferred embodiment.

FIG. 3: Voice Playback Module 12

Voice playback module 12 is a conventional, random-access, voice storage-and-playback device. As previously stated, module 12 is functionally and electrically similar to commercially available devices, and can be implemented according to conventional practice per the requirements given herein.

However, a block diagram of a preferred embodiment of module 12 is shown in FIG. 3 to further assist in understanding and implementing our invention. It consists of a QV-301 Integrated Circuit (IC) 17, manufactured by Quadravox, Inc., of Richardson, Tex. connected to an ISD33060 ChipCorder® IC 18, manufactured by ISD Corporation of San Jose, Calif. Together, IC 17 and IC 18 form an inexpensive, two-chip implementation of a random-access, voice-storage-and-playback system.

This configuration is identical to the one shown in the applications information provided by Quadravox for the QV-301 IC. This applications information includes both a schematic and description of the configuration shown in FIG. 3, and is available from Quadravox in both print and electronic forms (the latter via via Quadravox's website at http://www.quadravox.com).

The heart of the module is ChipCorder® IC 18. IC 18 provides recording-and-playback capability for multiple voice messages, offering a maximum total message duration of 60 seconds. IC 18 makes use of ISD's patented multi-level analog-storage technology, in which analog signals are stored directly (without need for analog-to-digital conversion) in a non-volatile memory array. Extensive data and applications information for this and other ChipCorder® ICs is available from ISD Corporation, both in CD-ROM format and on ISD's website at http://www.isd.com. IC 18 directly produces an audio output signal which drives amplifier 13. IC 18 requires 3-V power, which is obtained from a 3-V power line 20.

IC 18 is controlled by IC 17. IC 17 was specially developed by Quadravox to facilitate use of ChipCorder® ICs with pushbutton switches. IC 17 has seven active-low trigger inputs, of which six are used in the preferred embodiment. Each of these six trigger inputs is connected to one of six switches 16A through 16F (shown in FIG. 2) of switch assembly 11. IC 17 scans and debounces the six switch outputs, and generates control signals for IC 18. These control signals determine whether or not IC 18 is in an operational or stand-by mode, and cause IC 18 to reproduce one of several pre-established messages in response to manual actuation of switch assembly 11. In addition to controlling IC 18, IC 17 also issues a shutdown signal on a shutdown line 19 to both power supply 15 and amplifier 13. IC 17 brings shutdown 19 low when a switch is actuated, and returns line 19 high when the message reproduction is finished. Like IC 18, IC 17 requires 3-V power, which is obtained from 3-V power line 20.

IC 17 offers four modes of operation, determined by two binary mode control inputs:

A first input determines whether or not message selection occurs via discrete digital input (e.g., via pushbutton selection) or via binary code.

A second input determines whether or not messages are selected directly, or randomly.

In the preferred embodiment, IC 17 is configured in the pushbutton mode for direct message selection. In this mode, there is a one-to-one correspondence between the six trigger inputs of IC 18 used in the preferred embodiment, and six voice alert messages stored in IC 17: pulling one of IC 18's trigger lines low will cause IC 17 to play the corresponding message. However, the random message selection mode is used in an alternative embodiment to be described subsequently.

Additional detail concerning the design and operation of the configuration shown in FIG. 3 can be found at the aforementioned Quadravox and ISD web sites.

Figure 4:
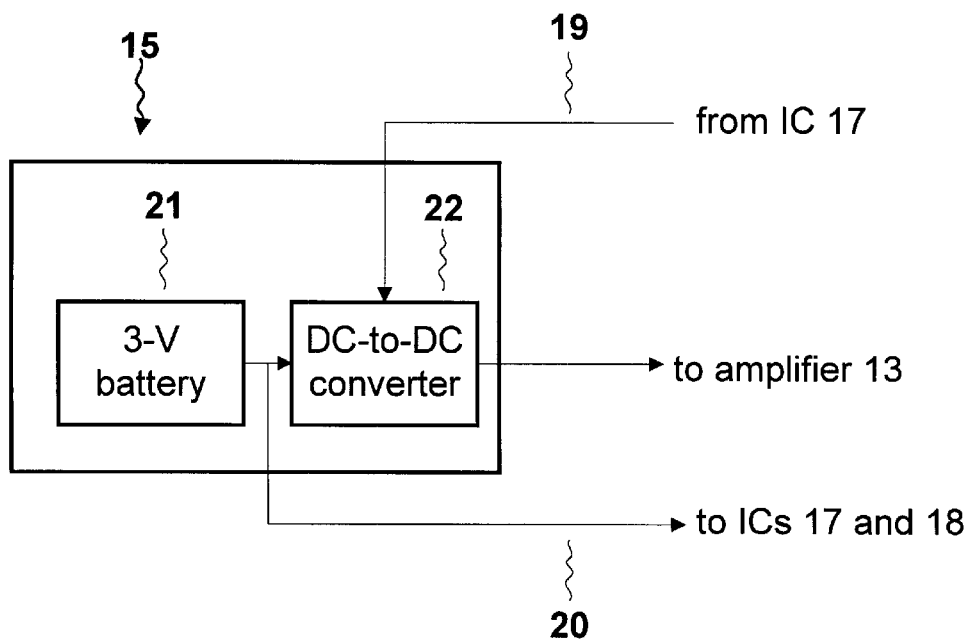
FIG. 4 is a block diagram of a power supply of the preferred embodiment.

FIG. 4: Power Supply 15

Power supply 15 is a conventional battery-based power supply. In the preferred embodiment, shown in FIG. 4, power supply 15 comprises a conventional 3-V battery 21 (consisting of two series-connected 1.5-V alkaline cells, not shown), driving a conventional switching-type DC-to-DC converter 22 (based on the MAX771 step-up DC-DC converter manufactured by Maxim Integrated Products of Sunnyvale, Calif.) to provide a regulated 6-V output. Extensive applications information and schematics for the MAX640 are available from Maxim's website at http://www.maxim-ic.com/.

Battery 21 drives ICs 16 and 17 directly via 3-V power line 20, while converter 22 drives amplifier 13. Converter 22 has a shutdown mode, which is entered by bringing shutdown line 19 low. As previously stated, IC 17 controls shutdown line 19.

Figure 5A:
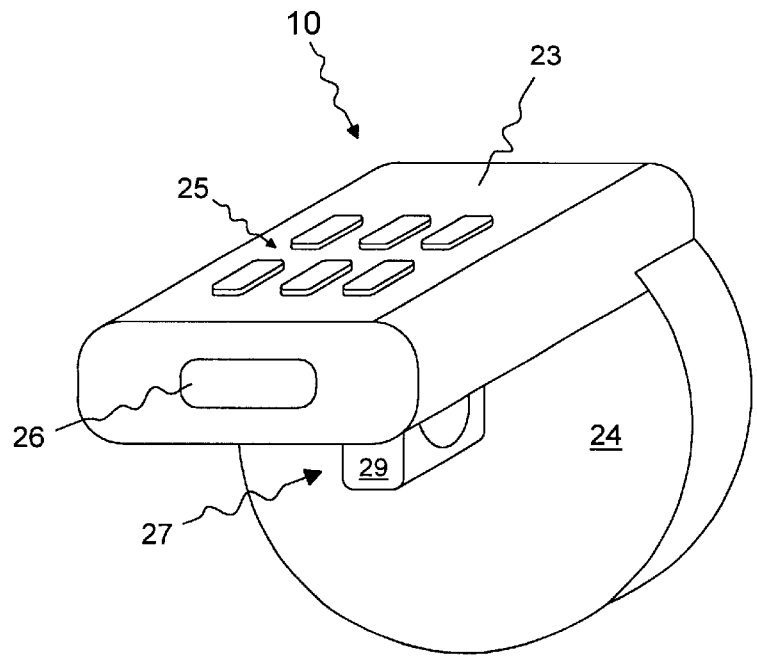
FIGS. 5A through 5C are sketches of the physical configuration of the preferred embodiment of the subject invention.

FIG. 5A: Physical Configuration, Perspective View

A perspective view of the physical configuration of a preferred embodiment of our invention is shown in FIG. 5A. The physical configuration is not critical, and can be modified in accordance with conventional practice, per the information given herein, to suit a particular application.

With the exception of speaker 14, the electronic portions of system 10 (previously shown in FIG. 1) are mounted on a conventional printed circuit board (not shown). In turn, these elements are contained within, and physically supported by, a main housing 23 and a speaker housing 24. Main lousing 23 contains a removable battery access panel (not shown).

In the preferred embodiment, main housing 23 and speaker housing 24 are of plastic, but other materials could also be used in accordance with conventional practice.

Speaker housing 24 is a conventional, drum-shaped assembly which contains speaker 14 (not shown). Speaker housing 24 is attached to main housing 23, which is a conventional box-shaped plastic assembly containing the balance of the electronic components previously referenced in FIG. 1. Housings 23 and 24 are attached so that their interior volumes are joined.

A button assembly 25 is located on the top surface of main housing 23. Button assembly 25 comprises six actuating buttons, each associated with a particular one of switches 16A through 16F previously referenced in FIG. 2.

Main housing 24 includes an acoustic vent 26, located on its rear surface.

The components previously referenced in FIG. 1 are mounted within housings 23 and 24 in a conventional manner. In particular, speaker 14 is mounted within speaker housing 24 so that its cone (not shown) faces forward, and so that housings 23 and 24, together with vent 26, constitute a conventional vented enclosure for speaker 14.

A conventional clamp assembly 27, including a lower portion 29, is attached to main housing 23.

Practitioners in the art will recognize that the physical configuration of system 10 is that of a conventional, battery-operated, electroacoustic system, such as the "All Weather AM/FM Bike Radio", part number 12-463, manufactured by Tandy Corporation.

Figure 5B:
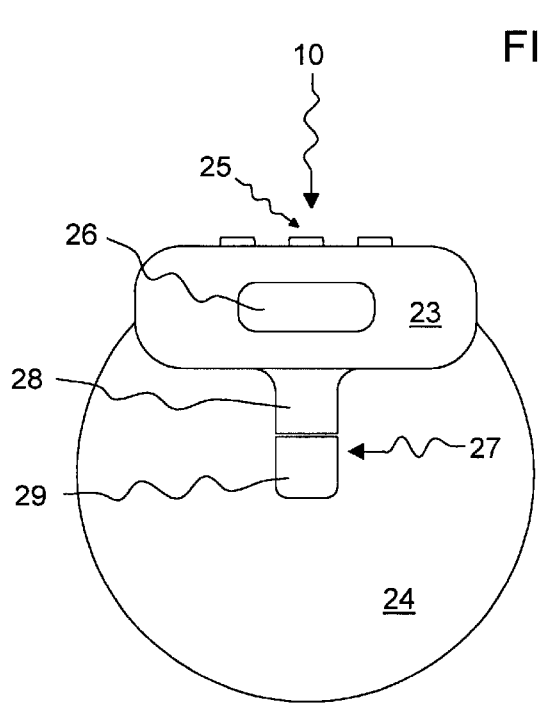

FIG. 5B: Physical Configuration, Rear View

As shown in FIG. 5B, clamp assembly 27 includes an upper portion 28, in addition to lower portion 29.

Figure 5C:
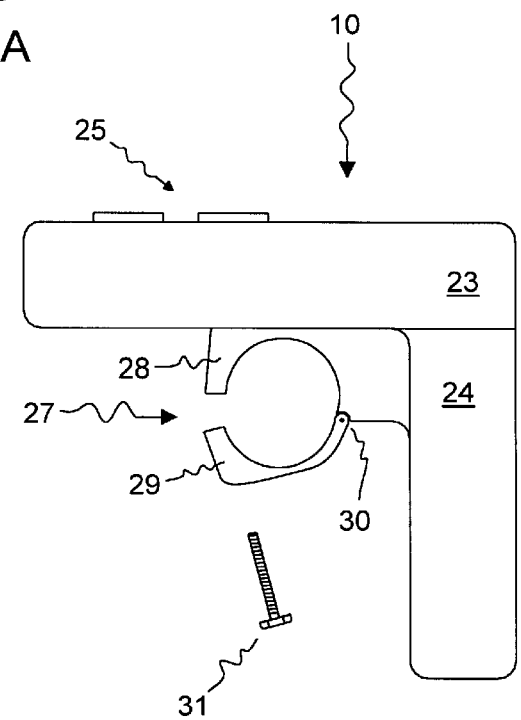

FIG. 5C: Physical Configuration, Side View

As shown in FIG. 5B, lower portion 29 of clamp assembly 27 is attached to upper portion 28 via a pivot 30. Lower portion 29 has a hole (not shown) to accept a bolt 31, and upper portion 28 is threaded to accept bolt 31. Clamp assembly 27, therefore, constitutes a conventional bolt-secured clamping device, as frequently used to attach devices to the handlebars of bicycles and similar vehicles. For example, clamp assembly 27 is functionally similar to that used of the "All Weather AM/FM Bike Radio", part number 12-463, manufactured by Tandy Corporation.

Operation of the Preferred Embodiment

FIG. 1: Electronic Operation—Overview

Referring to FIG. 1, at least one voice alert, or message, is pre-stored within module 12 in a conventional manner, at the time of manufacture of system 10 (optionally, system 10 can be provided with the capability to record voice alerts at any time, as described subsequently). In the preferred embodiment, six alerts are stored within module 12. These consist of:

Two instances of the phrase "passing on your left!"

Two instances of the phrase "passing on your right!"

Two instances of the phrase "thank you!"

The two instances of each phrase will typically be spoken with different, humorous accents, e.g., to represent different celebrity or cartoon characters. Alternatively, one of the two instances can be spoken in a businesslike tone, and the other in a more humorous manner.

During operation, a user selects a pre-stored voice alert by actuating switch assembly 11. Assembly 11, in turn, sends an electronic triggering signal to module 12, which produces an audio-frequency signal representing the selected voice alert. The signal is fed to amplifier 13, which amplifies it, and thereafter to speaker 14, which converts it into sound. Meanwhile, power supply 15 supplies power to module 12 and amplifier 13.

Practitioners in the art will recognize from FIG. 1 and the preceding description that, from an electronic standpoint, system 10 operates in the same manner as a conventional random-access voice-playback system. An example of such a system is the Tech/Four™, manufactured by the Mayer-Johnson Company of Solana Beach, Calif., USA.

FIGS. 2, 3, and 4: Electronic Operation

Referring to FIG. 2, actuation of any of six switches 16A through 16F composing switch assembly 11 causes a corresponding output line to be grounded. Each switch corresponds to one of six voice alerts pre-stored in module 12.

Referring to FIG. 3, actuation of any of switches 16A through 16F is sensed by the corresponding active-low input line of IC 17. This causes IC 17 to "wake up" from its standby mode, to pull shutdown line 19 low (thereby "waking up" amplifier 13 and DC-to-DC converter 22, not shown in FIG. 3), and to issue wake-up commands to IC 18. IC 17 also issues message-addressing commands to IC 18, causing it to reproduce the voice alert corresponding to the actuated switch. The alert is amplified by amplifier 13 and converted to sound by speaker 14.

After the alert is reproduced, IC 17 commands IC 18 to enter the standby mode, and brings shutdown line 19 high, thereby commanding amplifier 13 and DC-to-DC converter 22 to enter the standby mode. IC 17 then waits for the next actuation of switches 16A through 16F.

Figure 6A:
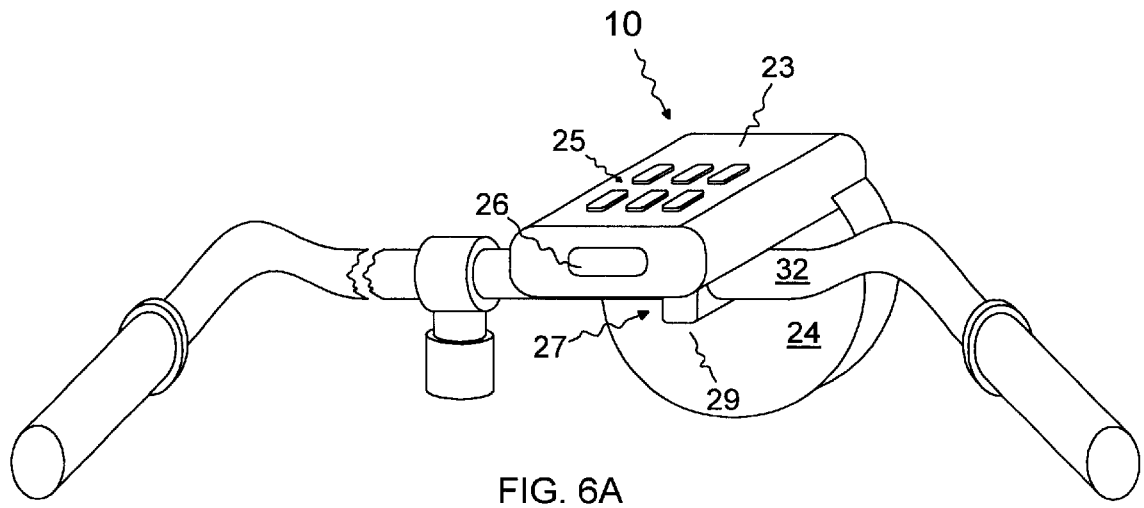
FIGS. 6A and 6B show installation and use of the preferred embodiment.
Figure 6B:
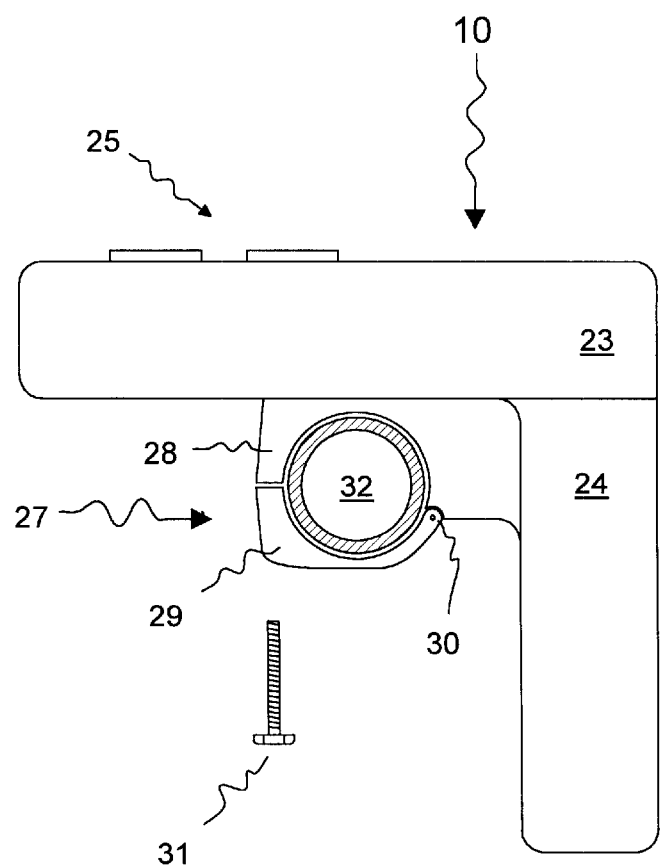

FIGS. 6A and 6B: Installed Configuration

As shown in FIG. 6A, system 10 is installed on a handlebar assembly 32 of a bicycle (not shown) or similar vehicle. System 10 is installed so that speaker housing 24 faces forward with respect to the direction of bicycle travel, and so that button assembly 25 is on top of handlebar assembly 32.

As shown in FIG. 6B, system 10 is secured on handlebar assembly 32 by means of clamping assembly 27 and bolt 31: bolt 31 passes through lower half 29 and is threaded into upper half 28, thereby causing handlebar assembly 32 to be gripped between lower half 29 and upper half 28.

FIG. 6A: Operation—User Perspective

System 10 is used when the operator is about to pass a pedestrian, in-line skater, or other bicyclist. If passing on the left, the operator simply presses one of the two left buttons on switch assembly 25. This causes system 10 to reproduce one of the two pre-stored "passing on the left" messages. Similarly, if passing on the right, the operator presses one of the two right buttons, causing system 10 reproduce one of the two pre-stored "passing on the right" messages. Finally, after passing, the operator presses one of the two center buttons, causing system 10 reproduce one of the two pre-stored "thank you" messages.

The forward placement and forward-facing orientation of speaker 14 (not shown) maximizes the distance in front of the handlebar assembly 32 over which the messages can be heard. The placement of button assembly 25 on top of handlebar assembly 32, and the upward orientation of button assembly 25, ensure convenient and rapid access to each button.

ALTERNATIVE EMBODIMENTS

The preferred embodiment described in the preceding paragraphs, system 10, is a particularly advantageous implementation of our invention. However, in view of the information provided herein, practitioners in the art will recognize that many other advantageous embodiments are possible. Each of these embodiments will share two characteristics:

Ability to reproduce at least one voice alert message in response to manual actuation of a button.

Means for mounting to the host bicycle in such a way that the sound produced by speaker 14 is directed substantially forward, and so that switch assembly 11 is within easy reach of the user.

Alternative Electronic Configuration

The electronic configuration of the preferred embodiment described in the preceding paragraphs offers a good balance of functionality and cost. However, the specific configuration of the preferred embodiment is incidental to the essence of our invention, and practitioners in the art will recognize that other electronic configurations could also be advantageously used.

Use of Conventional Microcontroller

For example, a conventional microcontroller could be used, instead of QV301 IC 17, to control ChipCorder® IC 18. In fact, ChipCorder® IC 18 was intended by the manufacturer to be controlled by a conventional microcontroller via a Serial Peripheral Interconnect (SPL) port, and the manufacturer's website provides extensive information on implementing such a configuration. While use of a conventional microcontroller would entail development of software, it would also offer at least two potential advantages:

Depending on the selected microcontroller, total system cost could actually be less than with the QV301.

The microcontroller could be programmed to give system 10 additional useful capabilities, such as the ability to play a voice alert message selected randomly from a group of pre-established messages, or to provide recording capability to enable users to record their own voice alerts. Such embodiments are subsequently described in greater detail.

Alternative Voice Storage Technology

The ChipCorder® technology used in the preferred embodiment is inexpensive, offers non-volatile storage of recorded messages, and offers excellent performance. However, practitioners in the art will recognize that other conventional voice storage technologies meeting the requirements described herein could also be used. For example, Digitized speech could be stored in a Read-Only Memory (ROM), accessed by a microcontroller, and converted to audio via a Digital-to-Analog converter. Such an approach is used to store music in various commercially available, portable, MP3 music players.

A speech synthesizer could be used: Digital codes representing speech components (e.g. phonemes) could be stored in a ROM, accessed by a microcontroller, and then converted to audio via a speech synthesizer IC. Such an approach is used, for example, in the bicycle accessory disclosed in U.S. Pat. No. 5,737,247 to Baer et al (1998).

Alternative Design Parameters

Of course, arbitrary design parameters, such as the number of messages (i.e., alerts) stored, the size of the system, or the design sound-pressure level, could be modified per conventional practice to suit the requirements of a particular application.

Number of Stored Alerts

Although the preferred embodiment stores six alert messages, it might be advantageous to store a greater or smaller number of messages, depending on the specific requirements at hand.

Reducing the number of messages would reduce system size (due to the reduced number of required switches and associated buttons), and would also slightly reduce overall cost (due to reduced storage requirements in module 12). For example, a system with the capability to store only two messages (such as "Excuse me!" and "thank you") would require only two buttons, and would still be useful in some applications. However, reducing the number of messages would also reduce the system's usefulness, novelty value, and market appeal.

Accordingly, increasing the number of stored messages would increase the system's usefulness, novelty value, and market appeal, but also its size, cost and operating complexity. One potentially advantageous means of increasing the number of stored messages without increase size and complexity is to provide the capability for random selection of alert messages, as discussed below.

Sound Pressure Level (SPL)

As previously stated, the preferred embodiment is capable of developing at least 60 dB SPL, measured on-axis 1 meter in front of the speaker. As is well known in the art, the maximum SPL capability of such a system depends on the factors such as the amplifier output power and the speaker reference efficiency. A greater SPL capability would enable the system to be heard further, increasing its usefulness, while a reduced SPL capability would offer the potential for reduced size and cost. This tradeoff can be made according to conventional practice to suit the requirements of the application at hand.

Random Alert Selection

Figure 7:
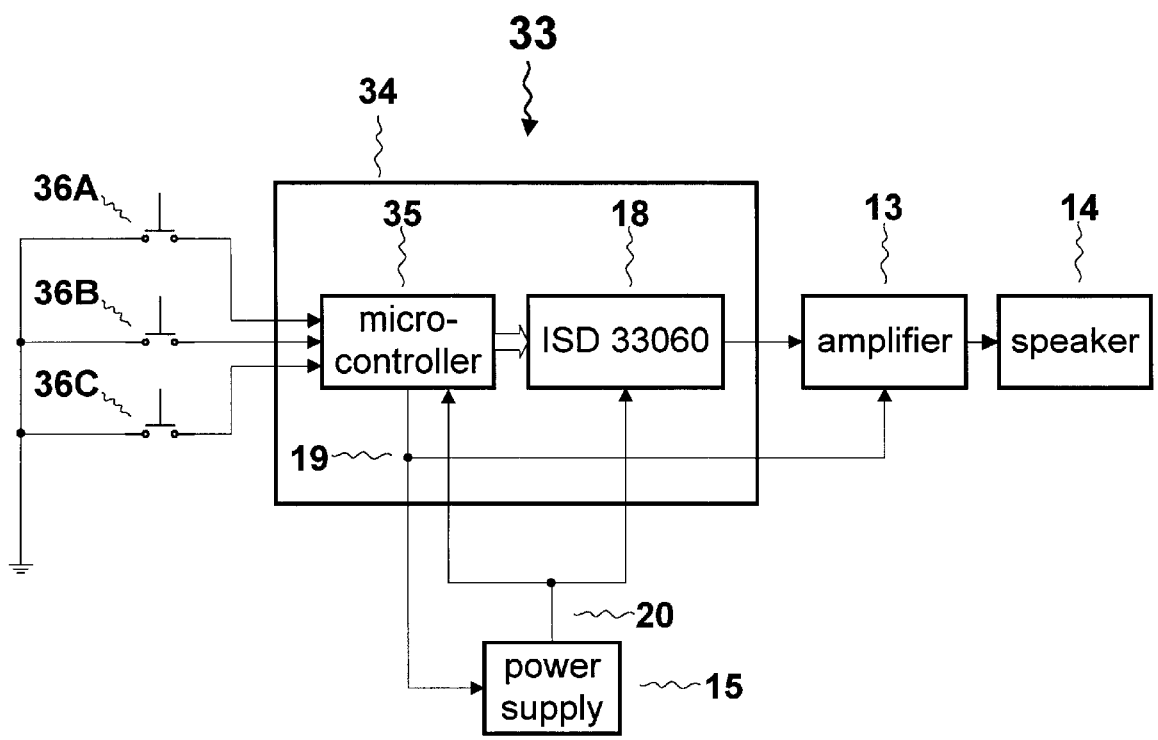
FIGS. 7 and 8 illustrate an alternative embodiment.

FIG. 7—Electrical Configuration

In the preferred embodiment (system 10) described previously, there is a one-to-one correspondence between switches 16A to 16F and six voice alert messages stored in module 12: actuating any of switches 16A to 16F will cause the system to reproduce the corresponding alert message.

However, for some applications, it could be advantageous to assign a group of messages to each switch, with an individual message selected randomly from the corresponding group when a particular switch is actuated.

Such a system would offer two advantages:

It would enhance the novelty aspect of the system, potentially encouraging its use.

It would enable a larger number of messages to be stored without a corresponding increase in the number of required switches (and hence, in the size of the button assembly).

For example, FIG. 7 shows the electrical configuration of an alternative embodiment, voice alert system 33, with random alert selection. System 33 is very similar to—and shares several elements with—the previously described system 10, but differs in the following respects:

It uses only three switches (switches 36A through 36C), instead of six as used in the preferred embodiment.

It has a voice playback module 34 capable of random message selection. In contrast, module 12 of the preferred embodiment provides the capability for only direct message selection.

Module 34

Module 34 differs from module 12 of the preferred embodiment in one important respect: it uses microcontroller 35, instead of IC 17, to control IC 18. Microcontroller 35 is a conventional microcontroller having at least four discrete I/O lines, an SPL port, and a low-power "steep" (i.e., standby) mode.

Microcontroller 35 receives 3-V power via power line 20. Three of microcontroller 35's I/O lines are connected to switches 36A through 36C, while the fourth I/O line is connected to shutdown line 19. Microcontroller 35's SPL port is connected to IC 18. By executing conventional software instructions, microcontroller 35 performs the following functions:

It scans switches 36A–36C, waiting for a switch actuation. When an actuation is detected, it "wakes up" (i.e., enters operational mode) and registers the identity of the actuated switch.

It brings standby line 19 low, thereby causing amplifier 13 and power supply 15 to exit the standby mode and become operational.

It issues commands to IC 18 via the SPL port to cause IC 18 to:
exit the standby mode and become operational; and
play a particular voice alert message (as described below, in Random Message Selection).

After the message is played, it:
Issues commands to IC 18 via the SPL port to enter the standby mode;
Brings standby line 19 high, thereby causing amplifier 13 and power supply 15 to enter the standby mode; and
Itself enters the standby mode, waiting for another switch actuation.

Message Selection

ChipCorder® devices (such as IC 18) are capable of playing back a single selected message from multiple stored voice messages. In system 33, 25 messages are stored in IC 18. After sensing a switch actuation, microcontroller 35 performs software operations to select one of the 25 messages for playback, depending on which of switches 36A–36C was actuated. The determination is done in the following manner.

The 25 messages are divided into three groups, with messages 1–10 assigned to Group A, messages 11–15 assigned to Group B, and messages 16–25 assigned to Group C.

When switch 36A is actuated, a message from Group A is randomly selected for playback, using a conventional pseudo-random selection algorithm. Similarly, when switch 36B is actuated, a message from Group B is randomly selected for playback. Finally, when switch 36C is actuated, a message from Group C is randomly selected for playback.

Microcontroller 35 then commands IC 18, via the SPL port, to play back the selected message.

Detailed information on message addressing in Chip-Corder® devices, and use of microcontrollers to control ChipCorder® device operation, is available from ISD.

Amplifier 13, Speaker 14, and Power Supply 15

Amplifier 13, speaker 14, and power supply 15 of system 33 are as previously described in connection with the preferred embodiment, system 10.

Figure 8:
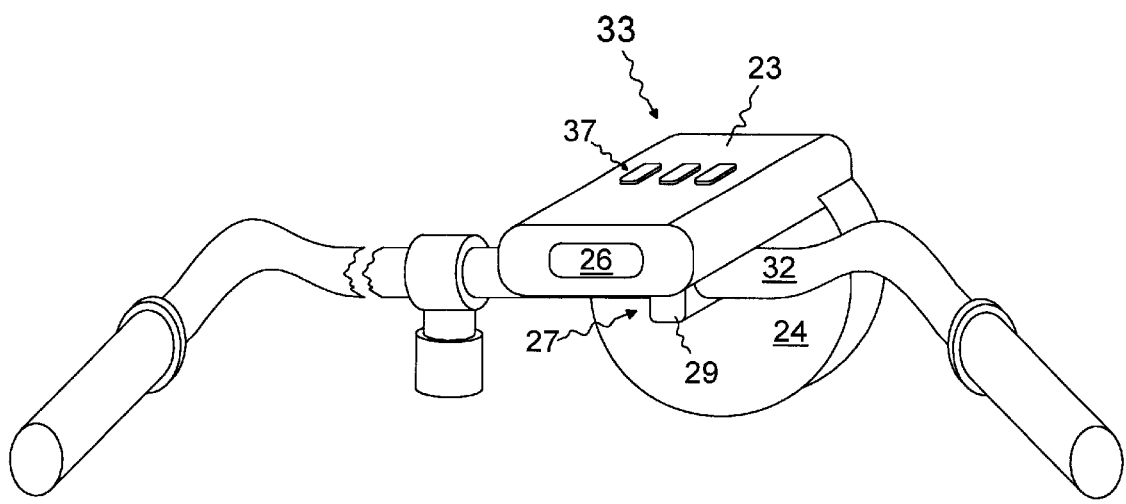

FIG. 8: Physical Configuration

As shown in FIG. 8, system 33 includes a button assembly 37 comprising three buttons. The buttons actuate switches 36A–36C (not shown), with the left-most button actuating switch 36A, the middle button actuating switch 36B, and the right-most button actuating switch 36C. The other elements shown in FIG. 7 are as previously described in connection with the preferred embodiment, system 10.

FIG. 8: Operation

At the time of manufacture, 25 voice alert messages are recorded and stored within module 34 (not shown). As previously stated, these messages are divided into three groups:

The ten Group A messages each convey the information that a bicycle is approaching or about to pass on the left (e.g., "passing on your left!"). While all Group A messages convey essentially the same information, they are spoken in different accents or voices (such as, for example, representations of celebrity or cartoon voices), or use different wording, to provide an entertaining variety of alerts.

The five Group B messages each convey a "thank you" message. Again, while the Group B messages convey the same information, they are spoken in different voices or accents, or use different wording.

The ten Group C messages each convey the information that a bicycle is approaching or about to pass on the right (e.g., "passing on your right!"). Again, the messages convey the same information, but are spoken differently.

System 33 is then installed on a host bicycle in the same manner as the previously described system 10. Like system 10, system 33 is used when the operator is about to pass a pedestrian, in-line skater, or other bicyclist. If passing on the left, the operator simply presses the left-most button of switch assembly 37. This causes system 33 to randomly reproduce one of the ten pre-stored Group A messages, warning of a bicycle approaching on the left. Similarly, if passing on the right, the operator presses the right-most button of assembly 37, causing system 33 reproduce one of the ten pre-stored Group C messages, warning of a bicycle approaching on the right. Finally, after passing, the operator presses the center button, causing system 33 reproduce one of the five pre-stored Group C "thank you" messages.

Recording Capability

Practitioners in the art will recognize that the preferred embodiment system 10 (or the alternative embodiment system 33) could be given the capability to allow the user to record his or her own alert messages, instead of (or in addition to) the factory-recorded messages. This could enhance the system's novelty value and market appeal.

Techniques for implementing such a recording capability are well-known in the art, and many such devices are commercially available. In fact, most conventional systems using the ChipCorder® device (as used in system 10 and system 33) offer a recording capability. Such a capability could be added to systems 10 and 33 by adding a microphone, a record switch, and appropriate logic elements (in the case of system 10) or software modifications (in the case of system 33). Detailed information on adding such a capability to ChipCorder®-based systems is available from ISD Corporation.

Alternative Physical Configuration

The physical configuration of the preferred embodiment is incidental to the essence of our invention, and practitioners in the art will recognize that many other configurations could also be advantageously used.

Alternative Housing Shape

The shapes of main housing 23 and speaker housing 24 could, of course, be modified to suit the particulars of a specific application. For example, for use on a child's bicycle, the housings could be redesigned so that the system resembles a motorcycle speedometer, a cartoon character, or some other novelty shape.

As another example, the housing could be given a more streamlined, aesthetically pleasing shape, e.g. "signaling device 10" shown by Hansen in U.S. Pat. No. 5,262,757 (1993). Like our systems 10 and 33, Hansen's signaling device includes a forward-facing speaker.

Alternative Mounting Location

While systems 10 and 33 are installed on handlebar assembly 32 of a host bicycle, alternative embodiments could be installed in other locations. For example, an alternative embodiment could be adapted for installation on the top tube of a bicycle frame.

Alternative Mounting Means

Systems 10 and 33 are mounted to the host bicycle via clamping assembly 27. However, other mounting means could also be used. For example, while clamping assembly 27 is a hinged assembly (incorporating upper portion 28 and lower portion 29, joined by pivot 30), a conventional one-piece clamp could be used instead. Such a clamp is shown, for example, as "tension band 130" by Rogowski in U.S. Pat. No. 4,981,243 (1991).

As another alternative, instead of being fixedly attached to housing 23, clamping assembly 27 could be made removable from housing 23. A similar detachable clamping means is used, for example, in the "AM/FM Bike Radio" (item number 12-643) manufactured by The Radio Shack® division of Tandy Corporation.

Alternative Speaker Configuration

In systems 10 and 33, speaker 14 is mounted in a vented enclosure (comprising main housing 23, speaker housing 24, and vent 26), and radiates directly forward. However, other configurations are possible, and might prove advantageous in certain applications:

A sealed enclosure could be used (e.g., via deletion of vent 26).

Speaker 14 could be horn-loaded (e.g., like a public-address loudspeaker).

Speaker 14 could be mounted with diaphragm horizontal, instead of vertical, with a duct to ensure that the sound is projected substantially in the direction of movement of the host bicycle.

Conclusion, Ramifications, and Scope

From the preceding discussion, it is evident that voice alert system 10 is capable of instantly signaling its user's presence and intended path to pedestrians, in-line skaters, and other bicyclists ahead of the user, thereby reducing risks of accidents while passing. It is also evident that, since it utilizes audible (rather than visual) alerts, system 10 is effective during both daytime and nighttime. Further, system 10 can reproduce entertaining or humorous messages, thereby encouraging use by those who might otherwise eschew safety devices. Finally, it is clear that system 10 can be implemented at low cost, using conventional components and techniques.

Although voice alert system 10 is the preferred embodiment of the subject invention, it will be apparent that many other useful embodiments are possible. Those skilled in the art will recognize that the construction and function of the elements composing the preferred and alternative embodiments described herein may be modified, eliminated, or augmented to realize many other useful embodiments, without departing from the scope and spirit of the invention as recited in the appended claims.

What is claimed is:

1. A bicycle-mounted voice alert system for projecting a plurality of different pre-established voice messages in front of a bicycle, said bicycle having a handlebar, said system comprising:

(a) a switch assembly comprises a plurality of actuating buttons, each actuating button capable of producing an unique electronic triggering signal upon an actuation of said actuating button by an operator;

(b) a voice playback system comprises a voice playback module, an amplifier, and a speaker; wherein said voice playback system is coupled to said switch assembly so as to receive said unique electronic triggering signal; a plurality of groups of pre-established voice messages are stored in the voice playback module, each group of pre-established voice messages corresponds to a respective actuating button; wherein said voice playback module is capable of randomly selecting and reproducing a particular pre-established voice message from a respective group of voice messages upon actuation of a respective actuating button which produces a respective unique electronic triggering signal;

(c) a power supply is coupled to said voice playback module for supplying power to said alert system;

(d) a first housing for housing said power supply and said voice playback system; and a second housing for housing said switch assembly;

(e) a first attaching means for attaching said first housing to said bicycle handlebar such that said switch assembly is within easy reach of said operator; and a second attaching means for attaching said second housing to said bicycle such that said voice message is produced forwardly and loudly which could be heard by surrounding individuals;

whereby said voice alert system is attached to said bicycle to project said pre-established message in a forward direction upon manual actuation of said actuating button, thereby providing a convenient means for the operator of said system to communicate said voice message to other individuals in front of said bicycle without the necessity of having to use the operator's voice for said communication.

2. A bicycle-mounted voice alert system for projecting a plurality of different pre-established voice messages in front of a bicycle, said bicycle having a handlebar, said system comprising:

(a) a switch assembly comprises at least one actuating button, said actuating button capable of producing an unique electronic triggering signal upon an actuation of said actuating button by an operator;

(b) a voice playback system comprises a voice playback module, an amplifier, and a speaker; wherein said voice playback system is coupled to said switch assembly so as to receive said unique electronic triggering signal, said voice playback module is capable of randomly selecting and reproducing a particular pre-established voice message from said plurality of different pre-established voice messages in response to said unique electronic triggering signal;

(c) a power supply is coupled to said voice playback module for supplying power to said alert system;

(d) a first housing for housing said power supply and said voice playback system; and a second housing for housing said switch assembly;

(e) a first attaching means for attaching said first housing to said bicycle handlebar such that said switch assembly is within easy reach of said operator; and a second attaching means for attaching said second housing to said bicycle such that said voice message is produced forwardly and loudly which could be heard by surrounding individuals;

whereby said voice alert system is attached to said bicycle to project said pre-established message in a forward direction upon manual actuation of said actuating button, thereby providing a convenient means for the operator of said system to communicate said voice message to other individuals in front of said bicycle without the necessity of having to use the operator's voice for said communication.

3. A bicycle-mounted voice alert system for projecting a plurality of different pre-established voice messages in front of a bicycle, said bicycle having a handlebar, said system comprising:

(a) a switch assembly comprises a plurality of actuating buttons, each actuating button capable of producing an unique electronic triggering signal upon an actuation of said actuating button by an operator;

(b) a voice playback system comprises a voice playback module, an amplifier, and a speaker; wherein said voice playback system is coupled to said switch assembly so as to receive said unique electronic triggering signal; a plurality of pre-established voice messages are stored in the voice playback module, each pre-established voice message corresponds to a respective actuating button; wherein said voice playback module is capable of reproducing a respective pre-established voice message upon actuation of a respective actuating button which produces a respective unique electronic triggering signal;

(c) a power supply is coupled to said voice playback module for supplying power to said alert system;

(d) a housing for housing said switch assembly, said power supply and said voice playback system;

(e) an attaching means comprises a clamp assembly for attaching said housing to said bicycle handlebar such that said switch assembly is within easy reach of said operator and said voice message is produced forwardly and loudly which could be heard by surrounding individuals;

whereby said voice alert system is attached to said bicycle to project said pre-established message in a forward direction upon manual actuation of said actuating button, thereby providing a convenient means for the operator of said system to communicate said voice message to other individuals in front of said bicycle without the necessity of having to use the operator's voice for said communication.

4. A bicycle-mounted voice alert system for projecting a plurality of different pre-established voice messages in front of a bicycle, said bicycle having a handlebar, said system comprising:

(a) a switch assembly comprises at least one actuating button, said actuating button capable of producing an unique electronic triggering signal upon an actuation of said actuating button by an operator;

(b) a voice playback system comprises a voice playback module, an amplifier, and a speaker; wherein said voice playback system is coupled to said switch assembly so as to receive said unique electronic triggering signal, said voice playback module is capable of reproducing a respective pre-established voice message from said plurality of different pre-established voice messages in response to said unique electronic triggering signal;

(c) a power supply is coupled to said voice playback module for supplying power to said alert system;

(d) a housing for housing said switch assembly, said power supply and said voice playback system;

(e) an attaching means comprises a clamp assembly for attaching said housing to said bicycle handlebar such that said switch assembly is within easy reach of said operator and said voice message is produced forwardly and loudly which could be heard by surrounding individuals;

whereby said voice alert system is attached to said bicycle to project said pre-established message in a forward direction upon manual actuation of said actuating button, thereby providing a convenient means for the operator of said system to communicate said voice message to other individuals in front of said bicycle without the necessity of having to use the operator's voice for said communication.

5. A bicycle-mounted voice alert system for projecting a plurality of different pre-established voice messages in front of a bicycle, said bicycle having a handlebar, said system comprising:

(a) a switch assembly comprises at least one actuating button, said actuating button capable of producing an unique electronic triggering signal upon an actuation of said actuating button by an operator;

(b) a voice playback system comprises a voice playback module, an amplifier, and a speaker; wherein said voice playback system is coupled to said switch assembly so as to receive said unique electronic triggering signal, said voice playback module is capable of randomly selecting and reproducing a particular pre-established voice message from said plurality of different pre-established voice messages in response to said unique electronic triggering signal;

(c) a power supply is coupled to said voice playback module for supplying power to said alert system;

(d) an attaching means comprises a clamp assembly for attaching said switch assembly to said bicycle handlebar such that said switch assembly is within easy reach of said operator and said voice message is produced forwardly and loudly which could be heard by surrounding individuals;

whereby said voice alert system is attached to said bicycle to project said pre-established message in a forward direction upon manual actuation of said actuating button, thereby providing a convenient means for the operator of said system to communicate said voice message to other individuals in front of said bicycle without the necessity of having to use the operator's voice for said communication.

\* \* \* \* \*